Aug. 6, 1946.  A. B. MYERS  2,405,365
POWER CHAIN SAW FRAME AND JOINTING BLOCK THEREFOR
Filed March 20, 1945  2 Sheets-Sheet 2
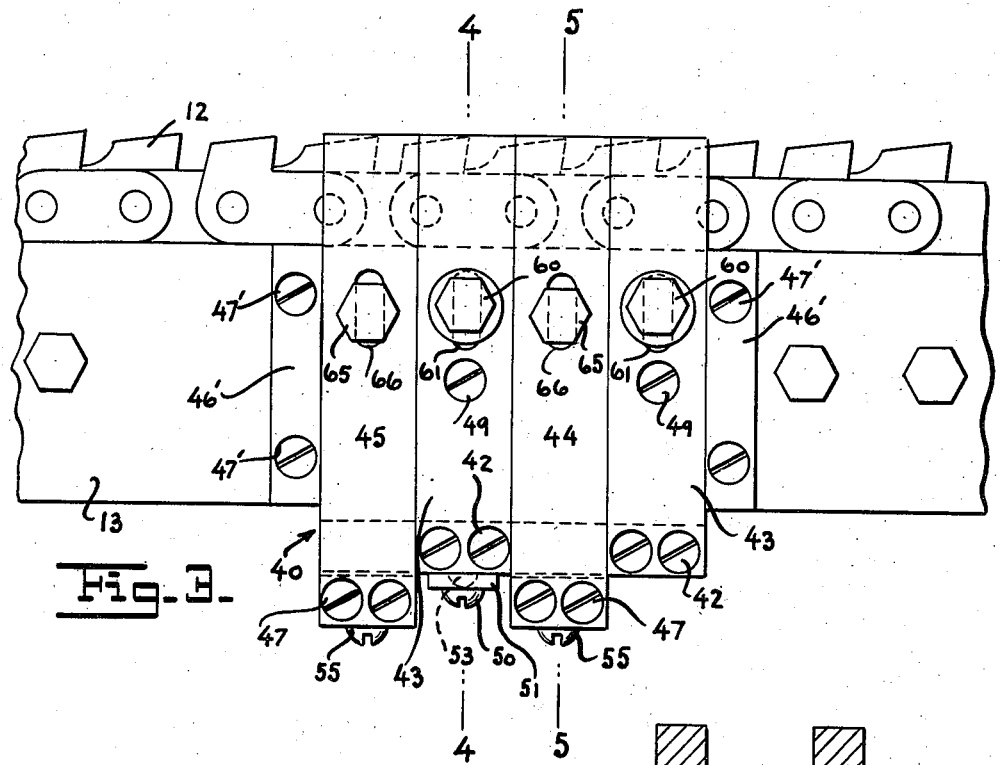
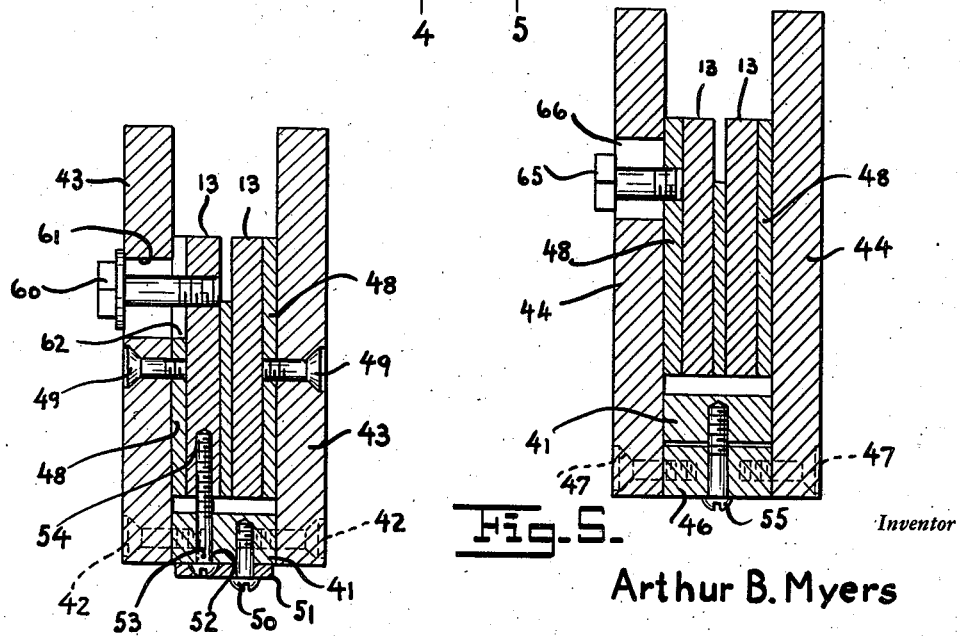
Inventor
Arthur B. Myers / Patented Aug. 6, 1946

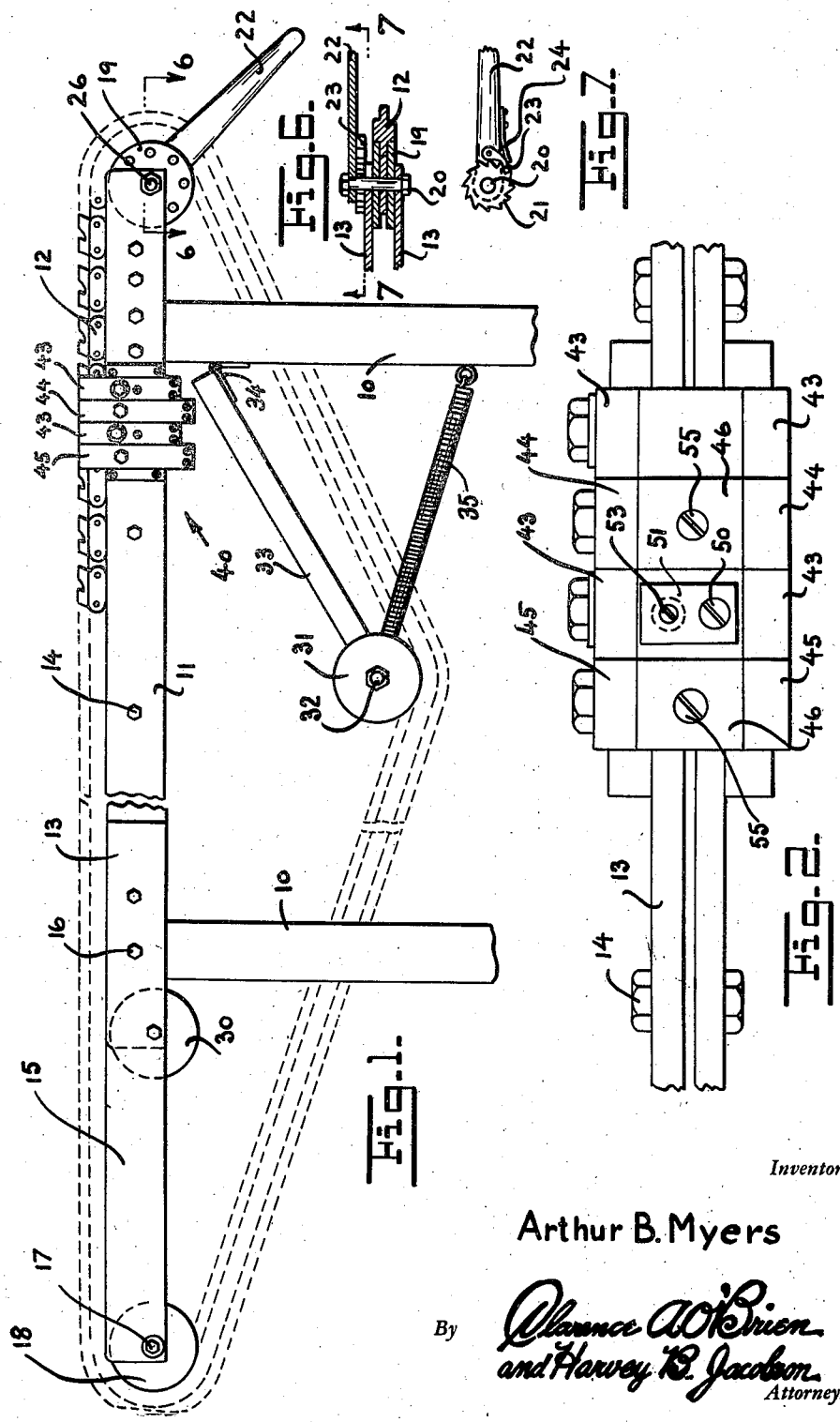

2,405,365

UNITED STATES PATENT OFFICE 2,405,365

POWER CHAIN SAW FRAME AND JOINTING BLOCK THEREFOR

Arthur B. Myers, Butte Falls, Oreg.

Application March 20, 1945, Serial No. 583,723

2 Claims. (Cl. 76—46)

This invention relates to a power chain saw frame, and a jointing block therefor.

A primary object of the invention is the provision of an improved chain saw frame adapted to facilitate the jointing and filing of chain saws in such manner as to reduce the time and effort normally required for such a job to a minimum.

An additional and very important object of this invention is the provision of an improved jointing block, characterized by a plurality of individually and collectively adjustable members so arranged that the different types of teeth on a chain saw may be leveled or jointed for the entire length of the saw by a single adjustment of the jointing block.

An additional object of the invention is the provision in a chain saw frame of means for selectively moving the chain saw through the jointing block a predetermined distance by movement of an appropriate lever or similar mechanism.

As conducive to a clearer understanding of this invention, it may here be pointed out that the average chain saw is comprised of a number of types of teeth, normally set in blocks of four, such blocks of four consisting, for example, of a right cutter tooth, an outside raker tooth (either right or left, alternately arranged in successive blocks), a left cutter tooth, and a center raker tooth. In jointing a saw, it is preferable, in order to insure maximum efficiency in the operation of the device, that all cutter teeth be of exactly the same height or length, that the side rakers be of a slightly lesser length, and that the center rakers be still shorter. Accordingly, in jointing a saw it has hitherto been necessary, while using a jointing block, to pass the saw through the block three times, adjusting the same between each operation for the different types of teeth. By means of the instant invention the block may be set once, the various component parts thereof being adjusted to the different heights of the different types of teeth, and the saw completely jointed by running the same through only once, a different adjustment being provided for each type of tooth. Additionally, by the provision of a ratchet mechanism to be hereinafter described, the chain may be moved forward successively in the saw frame a length equivalent to each block of four teeth, in such manner that successive blocks will be appropriately aligned with the jointing block in such manner that each type of tooth may be leveled to the desired extent. Additionally, by means of the frame of the instant invention, the chain may be filed after jointing from either side of the frame along substantially the entire length thereof.

Still another object of the invention resides in the provision of such a device which will be sturdy and durable in construction, reliable and efficient in operation, and comparatively simple and inexpensive to manufacture and assemble.

Other objects reside in the combinations of elements, arrangements of parts and features of construction, all as will be more fully pointed out hereinafter and disclosed in the accompanying drawings, wherein there is shown a preferred embodiment of this inventive concept.

In the drawings:

Figure 1 is a side elevational view of one form of saw frame constructed in accordance with this invention, certain parts thereof being broken away, and certain other parts being indicated in dotted lines.

Figure 2 is an enlarged fragmentary bottom elevational view of a portion of the structure shown in Figure 1 disclosing the bottom of the jointing block.

Figure 3 is a side elevational view of the jointing block, certain concealed portions thereof being indicated in dotted lines.

Figure 4 is a sectional view taken substantially along the line 4—4 of Figure 3.

Figure 5 is a sectional view taken substantially along the line 5—5 of Figure 3.

Figure 6 is a sectional view taken substantially along the line 6—6 of Figure 1, as viewed in the direction indicated by the arrows, and Figure 7 is a sectional view taken substantially along the line 7—7 of Figure 6, as viewed in the direction indicated by the arrows.

Similar reference characters refer to similar parts throughout the several views of the drawings.

Having reference now to the drawings, suitable supports 10 carry a guide 11 upon which a chain saw 12 is adapted to be positioned for jointing and sharpening. The guide 11 is comprised of a pair of spaced members 13, having a groove therebetween, and secured in related assembly, as by bolts 14. One extremity of the member 11 carries a removable extension 15 secured thereto, as by bolts 16, at the extremity of which is rotatably mounted, as on an axle 17, a grooved pulley 18 serving to support the saw 12. The opposite end of the guide 11 carries a sprocket wheel 19, mounted for rotation, as on an axle 20. The axle 20 also carries exteriorly of the guide 11 a ratchet 21 and a handle 22 on which is pivotally mounted a pawl 23 spring pressed, as by a leaf spring 24, toward the ratchet 21. Thus, it will be seen that movement of the operating handle 22 serves by rotation of the sprocket 19 to advance the chain a predetermined distance for a purpose to be more fully described hereinafter.

A pulley 30 is positioned adjacent the extremity of the guide 11, and may be utilized in place of the pulley 18 when jointing saws of sharter lengths.

The chain is held taut and in position on the guide, as by means of a guide pulley 31, mounted on an axle 32, carried by a supporting member 33 hingedly secured, as by a hinge 34, to one of the supporting posts 10. A relatively heavy tension spring 35 secured at its opposite extremities to one end of the member 33 and a lower portion of the supporting posts 10 below the hinge 34 serves to bias the guide pulley 31 downwardly in such manner as to tauten the chain regardless of the length thereof within the limits of the size of the frame.

The joining block of the instant invention, generally indicated at 40, is positioned at a desirable point on the guide 11, and includes a spaced plate 41, to which are secured, as by screws 42, oppositely disposed base pairs of side members 43. Each of the plates 43 is substantially the width of a saw tooth, and the pairs of plates are spaced apart the width of an additional tooth. This space is occupied by a further pair of plates 44, and a still further pair of plates 45 is positioned at an end of the assembly beyond one of the pairs 43.

The pairs of plates 44 and 45 are slightly greater in length than the plates 43, and extend a distance below the member 41, being joined together by blocks 46, to which they are secured, as by screws 47. Supporting members 46' are secured to the guide members 13, as by screws 47', and serve to hold the jointing plates in alined vertical relation. Additional guide members 48 positioned interiorly of the members 43, 44 and 45 and secured to the members 43, as by screws 49, serve to retain the sides of the jointer block assembly in spaced relation to the guide members 13.

As best shown in Figures 2 and 4, the member 41 has secured thereto, as by a screw 50, a plate 51, through which is passed an aperture in alignment with a suitable smooth bore 52 extending through the member 41. An adjusting screw 53 extends through the bore 52 and threadedly engages a threaded recess 54 positioned in the lower surface of one of the members 13. Thus, it will be seen that rotation of the adjusting screw 53 moves the block 41 and correspondingly the side plates 43. Each of the members 46 is secured to the block 41 by means of an adjusting screw 55 which passes through a smooth bore in the member 46 and threadedly engages in an aligned threaded aperture in the block 41. Thus, movement of the adjusting screw 53 serves to move the entire assembly upwardly or downwardly with respect to the members 13 and correspondingly the saw 12. Conversely, movement of either of the screws 55 serves only to move its associated member 46, and accordingly only the side plates 44 or 45 associated with the block 46.

The plates 43 are held in position, as by means of set screws 60 which pass through suitable slots 61 in the plates and corresponding aligned slots 62 in the members 48 and engage in suitable threaded apertures in the member 13. Correspondingly, the plates 44 and 55 are held in position, as by set screws 65, positioned in slotted apertures 66 and engaging in threaded apertures in plate 48.

From the foregoing, the operation of the device should now be readily understandable. The chain saw 12 is first placed on the guide member 13 and adjusted over the sprocket 19 and pulley 18 or 30, in accordance with the length of the chain, and tensioned by means of the pulley 31. The saw is then brought into position by movement of the handle 22 until a block of teeth, or group of four as above described, are aligned with respect to the jointing block 40, the cutting teeth being aligned with the side plates 43 and 43. A straight edge is then placed transversely across one of the pairs of plates 43, set screw 60 loosened, and the assembly adjusted by means of the adjusting screw 53 until the tip of the associated cutter tooth touches the straight edge. The members 43 may then be locked in position by means of set screws 60. The straight edge is now placed lengthwise of the jointing block 40, and the members 44 and 45 independently adjusted by means of the screws 55, a feeler gauge placed beneath the straight edge being utilized to determine the proper setting of each of these members, in order to provide proper jointing for the raker teeth.

After each group of teeth has been properly aligned, the chain is moved forwardly by means of the ratchet mechanism above described until the next group of teeth is in proper alignment with the jointing block. Thus, it will be seen that the entire chain may be joined in a single operation, without the necessity of readjusting the jointing block for each different group of teeth.

It will be seen that the jointing block may be readily removed from the frame if desired and the frame utilized for the sharpening of other types of chain saws.

Now, from the foregoing, it will be seen that there is herein provided an improved saw frame and jointing block therefor which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A device of the character described comprising a guide adapted to support a chain saw including spaced parallel interconnected frame members, a jointing block associated therewith including a base plate, spaced pairs of oppositely disposed side plates secured to said base plate, means for adjusting said base plate and spaced pairs of side plates with respect to said frame members to align the saw cutting teeth, means between said side plates and said frame members for locking the same in adjusted position, a pair of spaced base plates disposed below said first mentioned base plate, spaced pairs of oppositely disposed side plates secured to said spaced base plate, independent means extending through said spaced base plates and said first mentioned base plate for adjusting said base plates and attached side plates with respect to said frame members to secure the proper jointing of the saw raker teeth.

2. A device of the character described comprising a guide adapted to support a chain saw including spaced parallel interconnected frame members, a jointing block associated therewith including a base plate, spaced pairs of oppositely disposed side plates secured to said base plate, means for adjusting said base plate and spaced pairs of side plates with respect to said frame members to align the saw cutting teeth, means between said side plates and said frame members for locking the same in adjusted position, a pair of spaced base plates disposed below said first mentioned base plate, spaced pairs of oppositely disposed side plates secured to said spaced base plates, independent means extending through said spaced base plates and said first mentioned base plate for adjusting said spaced base plates and attached side plates with respect to said frame members to secure the proper jointing of the saw raker teeth, and means for moving said chain saw to the next adjacent group of teeth after a group of teeth has been properly alined to effect the joining of the entire chain saw in a single operation without readjusting the jointing block for each different group of teeth.

ARTHUR B. MYERS.